(12) United States Patent
Yamada et al.

(10) Patent No.: US 8,061,595 B2
(45) Date of Patent: Nov. 22, 2011

(54) DISPLAY DEVICE, DATA PROCESSING METHOD AND DATA PROCESSING SYSTEM USING THE DISPLAY DEVICE

(75) Inventors: Yasuhiro Yamada, Tokyo (JP); Takahisa Hakoishi, Kanagawa (JP); Hiroshi Sugaya, Tokyo (JP)

(73) Assignee: Sony Corporation, Tokyo (JP)

( * ) Notice: Subject to any disclaimer, the term of this patent is extended or adjusted under 35 U.S.C. 154(b) by 702 days.

(21) Appl. No.: 12/282,359

(22) PCT Filed: Apr. 3, 2007

(86) PCT No.: PCT/JP2007/057488
§ 371 (c)(1),
(2), (4) Date: Sep. 10, 2008

(87) PCT Pub. No.: WO2007/116888
PCT Pub. Date: Oct. 18, 2007

(65) Prior Publication Data
US 2009/0032584 A1  Feb. 5, 2009

(30) Foreign Application Priority Data

Apr. 3, 2006 (JP) .................................. 2006-102485
Sep. 29, 2006 (JP) .................................. 2006-268430

(51) Int. Cl.
*G06K 5/00* (2006.01)

(52) U.S. Cl. .................... 235/380; 235/379; 235/462.13

(58) Field of Classification Search .................. 235/380, 235/375, 487, 382, 379, 462.01, 462.13
See application file for complete search history.

(56) References Cited

U.S. PATENT DOCUMENTS

| 6,131,811 | A | * | 10/2000 | Gangi | 235/380 |
| 7,552,867 | B2 | * | 6/2009 | Waltman | 235/379 |
| 7,578,436 | B1 | * | 8/2009 | Kiliccote | 235/380 |
| 2004/0094618 | A1 | | 5/2004 | Okamura et al. | |

FOREIGN PATENT DOCUMENTS

| JP | 2000 20823 | 1/2000 |
| JP | 2000-20823 | 1/2000 |
| JP | 2004 5064 | 1/2004 |
| JP | 2004-5064 | 1/2004 |
| JP | 2004 171143 | 6/2004 |
| JP | 2006 23864 | 1/2006 |

* cited by examiner

*Primary Examiner* — Karl D Frech
(74) *Attorney, Agent, or Firm* — Oblon, Spivak, McClelland, Maier & Neustadt, L.L.P.

(57) ABSTRACT

The present invention has non-contact communication means (3a) configured to read a card identifier ID stored in a memory of an IC card, a barcode generation unit (22) configured to generate a two-dimensional barcode of a bonus data associated with the card identifier ID read by the non-contact communication means (3a), and a display unit (13) configured to display the two-dimensional barcode of the bonus data generated by the barcode generation unit (22). And, the bonus data displayed on a display unit 13 in the two-dimensional barcode is read by a barcode reader (2a) of a POS terminal (2).

10 Claims, 10 Drawing Sheets

| CONTENTS OF COUPON<br>CONTENTS OF BONUS (DISCOUNT AMOUNT, DISCOUNT RATE, ETC.)<br>CONDITIONS OF USE (EXPIRATION DATE, LIMITED DATE, LIMITED COUNT, USABLE LOCATION) |
|---|
| INFORMATION ABOUT ISSUER (COMPANY NAME, PHONE NUMBER, URL, ADDRESS, MAP INFORMATION, BUSINESS DAYS, HOURS) |
| TYPE OF COUPON (ARTICLE, SERVICE CATEGORY) |
| IDENTIFIER FOR COUPON INDIVIDUAL IDENTIFICATION<br>COUPON DISTRIBUTION DATE<br>IDENTIFIER FOR IDENTIFYING COUPON DISTRIBUTION LOCATION |

FIG.10

DISPLAY DEVICE, DATA PROCESSING METHOD AND DATA PROCESSING SYSTEM USING THE DISPLAY DEVICE

TECHNICAL FIELD

The present invention relates to a display device configured to obtain bonus data by use of an IC card and a data processing method and a data processing system that use this display device.

The present application claims a priority on the basis of Japanese Patent Application No. 2006-102485 filed Apr. 3, 2006 in Japan and Japanese Patent Application No. 2006-268430 file on Sep. 29, 2006 in Japan that are incorporated herein by reference.

BACKGROUND ART

Conventionally, a following method is known for getting a discount at the time of payment by use of electronic coupons accumulated in an IC card. First, a terminal on which contents of an electronic coupon can be displayed is prepared, the contents are looked at by a cashier for confirmation, and discounting is executed. Second, a device by which a paper printed with discount contents of an electronic coupon is outputted is prepared, this paper is read by a cashier through a barcode reader of a POS (Point Of Sale) terminal, and discounting is executed. Third, a device for reading an electronic coupon is connected to a POS terminal to interlocking and discounting is executed.

However, the first method requires human confirmation, thereby making it possible to cause discounting in an illegal manner. The second method allows illegal discounting by copying paper. The third method requires a major change in POS systems.

Also, patent documents similar hereto include Japanese Patent Laid-open No. 2006-23864. However, this patent document has no idea of using existing POS systems.

DISCLOSURE OF INVENTION

Technical Problem

The present invention has been made in consideration of the above-mentioned problems and one object of the present invention is to provide a display device capable of minimizing the change in a POS system in applying bonus data, such as electronic coupons, to the POS system, and a data processing method and a data processing system that use this display device.

Also, another object of the present invention is to provide a display device capable of preventing the illegal use of bonus data and a data processing method and a data processing system that use this display device.

A display device associated with the present invention includes: non-contact communication means configured to read a card identifier stored in a memory of an IC card; generation means configured to generate a one-dimensional or two-dimensional symbol of bonus data associated with the card identifier read by the non-contact communication means; and display means configured to display the symbol of the bonus data generated by the generation means. And, the bonus data displayed in the symbol displayed on the display means is read by a reading means of a POS terminal.

A data processing method associated with the present invention includes: a step of reading, through non-contact communication means, a card identifier stored in a memory of an IC card; a step of generating, through generation means, one-dimensional or two-dimensional symbol of bonus data associated with the card identifier read by the non-contact communication means; a step of displaying bonus data generated through the generation means onto display means in the form of a symbol; and a step of reading, through reading means of a POS terminal, the bonus data displayed on the display means in the form of a symbol.

Further, a data processing system associated with the present invention has a POS terminal and a display device arranged in the vicinity thereof. The above-mentioned POS terminal is connected with reading means configured to read one-dimensional or two-dimensional symbol of an article, and the display device has non-contact communication means configured to read a card identifier stored in a memory of an IC card, generation means configured to generate one-dimensional or two-dimensional symbol of bonus data associated with the card identifier read by this non-contact communication means, and display means configured to display the symbol of the bonus data generated by this generation means. The reading means of the POS terminal further is connected to the display device via ripping means, wherein, when the symbol of the article has been read by the reading means, the display means displays a symbol of bonus data matching article information attached to an article read by the reading means among the bonus data associated with the card identifier read by the non-contact communication means.

A data processing method associated with the present invention has: a step of reading a card identifier stored in a memory of an IC card by non-contact communication means; a step of reading one-dimensional or two-dimensional symbol of an article by reading means of the POS terminal connected to a display device via ripping means; a step of generating, by generating means, a symbol of bonus data matching article information attached to an article read by the reading means among bonus data associated with the card identifier read by the non-contact communication means; a step of displaying the bonus data generated by the generating means onto display means in the form of a symbol; and a step of reading, by the reading means, the bonus data displayed on the display means in the form of a symbol.

According to the present invention, for example, a display device of the present invention is arranged in the vicinity of a POS terminal and bonus data to be identified by an IC card can be displayed in one-dimensional or two-dimensional symbol, so that existing POS terminals need not be changed in design. Consequently, coupon services using IC cards can be easily started.

BEST MODE FOR CARRYING OUT THE INVENTION

The following describes a display device 10 to which the present invention is applied with reference to the accompanying drawings.

Figure 1:
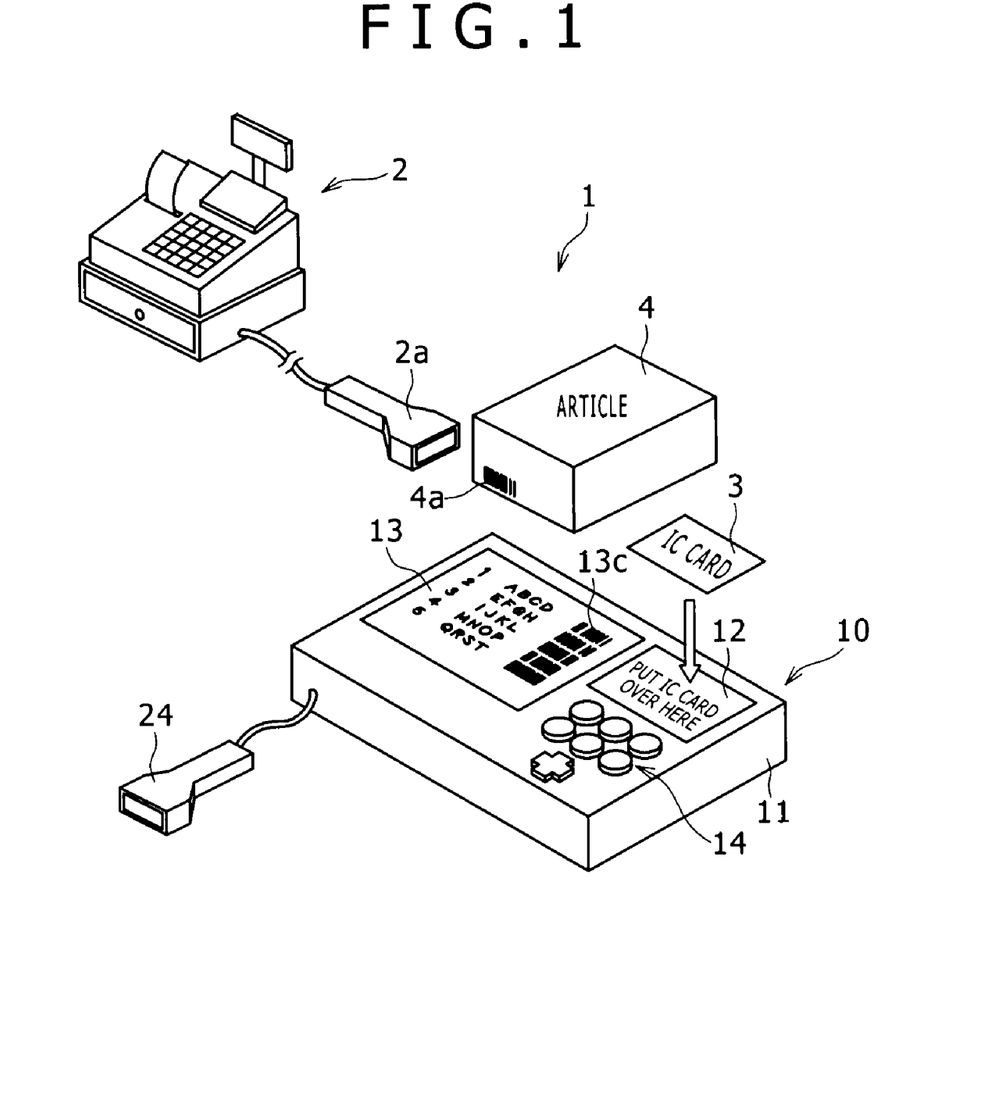
FIG. 1 is a schematic diagram illustrating a configuration of a sale system using a display device to which the present invention is applied.

As shown in FIG. 1, a sale system 1 in which the display device 10 is applied with the present invention has a POS terminal 2 installed at a store, such as a supermarket and so on, and the display device 10 applied with the present invention that is installed in the vicinity of an installation place of this POS terminal 2. This display device 10 has, on a device main unit 11 making up a housing, a device-side non-contact communication unit 12 for communication with an IC card 3 and a display unit 13. The device-side non-contact communication unit 12 gets a card identifier ID of the IC card by communicating with the IC card 3, generates a barcode that is one-dimensional symbol of a coupon data CD associated with the obtained card identifier ID of the IC card, and displays the barcode on the display unit 13. The device main unit 11 further has an operation unit 14 through which one or more barcodes can be selected from among a plurality of barcodes displayed on the display unit 13.

The POS terminal 2, as shown in FIG. 1, has a barcode reader 2a, reads, by this barcode reader 2a, a barcode 13c displayed on the display unit 13, and reads a barcode 4a of an article 4 that is to be purchased by a customer who is a card holder of the IC card 3, thereby making settlement. Consequently, on the POS terminal 2, settlement can be made with a price after discount by reflecting a coupon onto a purchase price of the article 4. The barcode reader 2a has a light source and a detector for detecting a light emitted from the light source and reflected from a barcode surface and reads a signal recorded to the barcode by detecting, by the detector, the light reflected from a barcode surface. In addition, the barcode reader 2a reads a signal recorded to a barcode by capturing an image of a barcode through an imaging element, such as CCD (Charge Coupled Devices) and so on.

Figure 2:
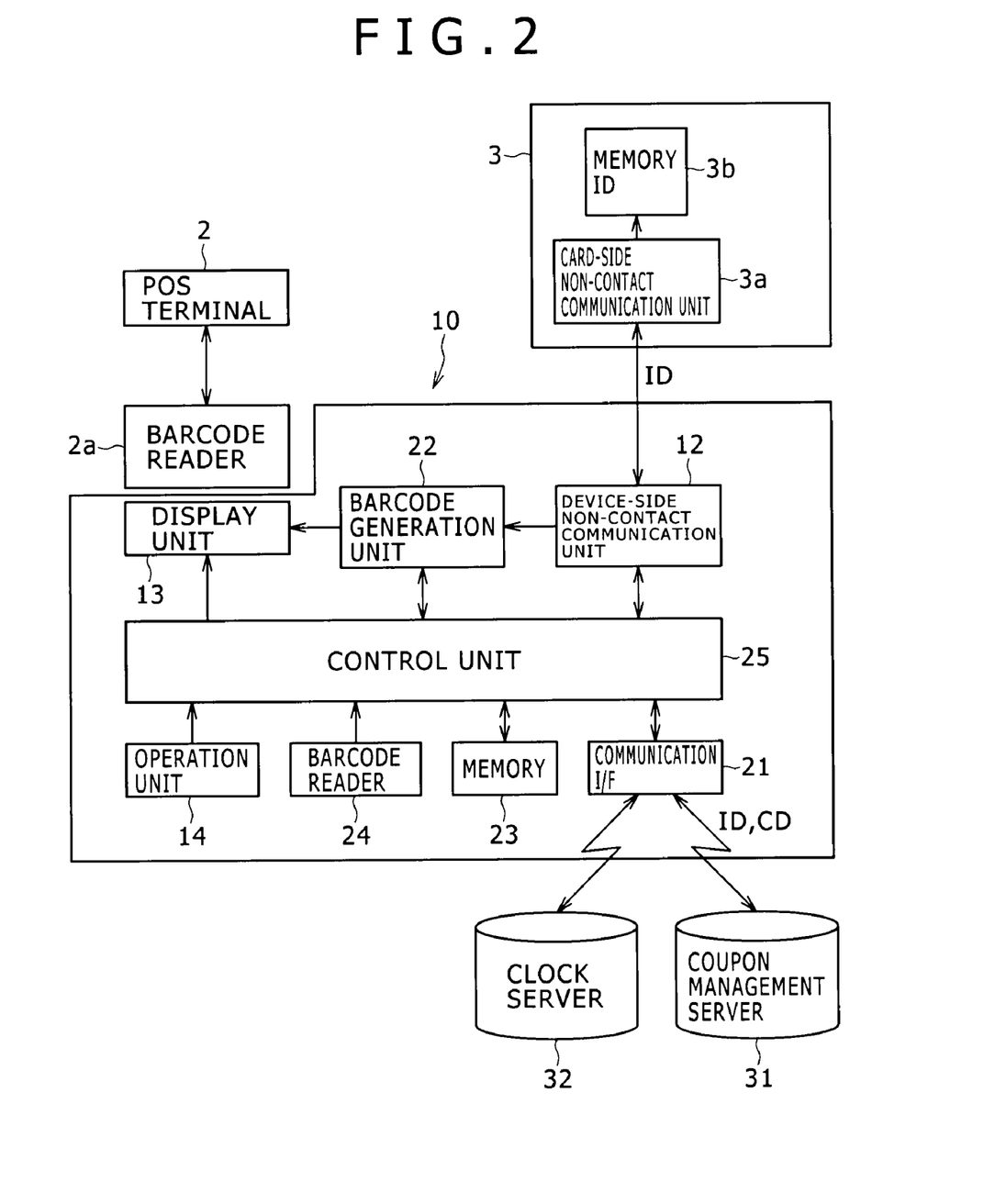
FIG. 2 is a block diagram illustrating the display device to which the present invention is applied.

The following describes a circuit configuration of the display device 10 to which the present invention is applied, with reference to FIG. 2. The display device 10 to which the present invention is applied has the device-side non-contact communication unit 12 shown in FIG. 1, a communication I/F 21 for accessing a coupon management server 31 for managing coupon data CD on the basis of a card identifier ID of the IC card 3 stored in the IC card 3 obtained by the device-side non-contact communication unit 12 and a clock server 32 for managing clock, a barcode generation unit 22 for generating a barcode on the basis of the coupon data CD obtained from the coupon management server 31, the above-mentioned display unit 13 for displaying the barcode, the operation block 14 that is operated by a store personnel or a customer who is an operator of the POS terminal 2 so as to generate an operation signal according to the operation done, a memory 23 for managing articles handled by a store, an identifier of that store and so on, a barcode reader 24 for reading a barcode 4a of the article 4, and a control unit 25 for controlling an entire operation.

The device-side non-contact communication unit 12 executes communication with an IC card 40 by short-distance or near-distance non-contact wireless communication, such as RFID (Radio Frequency Identification System), NFC (Near Field Communication) and so on with the IC card 3. As shown in FIG. 2, the IC card 3 has a card-side non-contact communication unit 3a for communication with the device-side non-contact communication unit 12 and a card memory 3b for storing various kinds of information. With management data, such as the card identifier ID unique to the IC card 3 and so on, stored in the card memory 3b, the IC card 3 can transfer these management data with the device-side non-contact communication unit 12 of the display device 10 via the card-side non-contact communication unit 3a. To be more specific, each of the device-side non-contact communication unit 12 and the card-side non-contact communication unit 3a has an antenna coil that magnetically couples with the other by inductive coupling, thereby executing non-contact data communication between IC card and reader/writer. When the IC card 3 is held over it, the device-side non-contact communication unit 12 communicates with the IC card 3 to get the card identifier ID of the IC card 3 stored in the card memory 3b of the IC card 3.

The communication I/F 21 accesses the coupon management server 31 via a network, such as WAN (Wide Area Network), LAN (Local Area Network), transmits the card identifier ID of the IC card 3 obtained by the device-side non-contact communication unit 12 to the coupon management server 31, and gets the coupon data CD associated with the card identifier ID of the IC card 3 from the coupon management server 31. It should be noted that, in this process, as the coupon data CD, log data and so on of a card holder identified by the card identifier ID managed by the coupon management server 31, such as a location at which the card holder, such as a customer and so on, gets the coupon, may be obtained.

Figure 3:
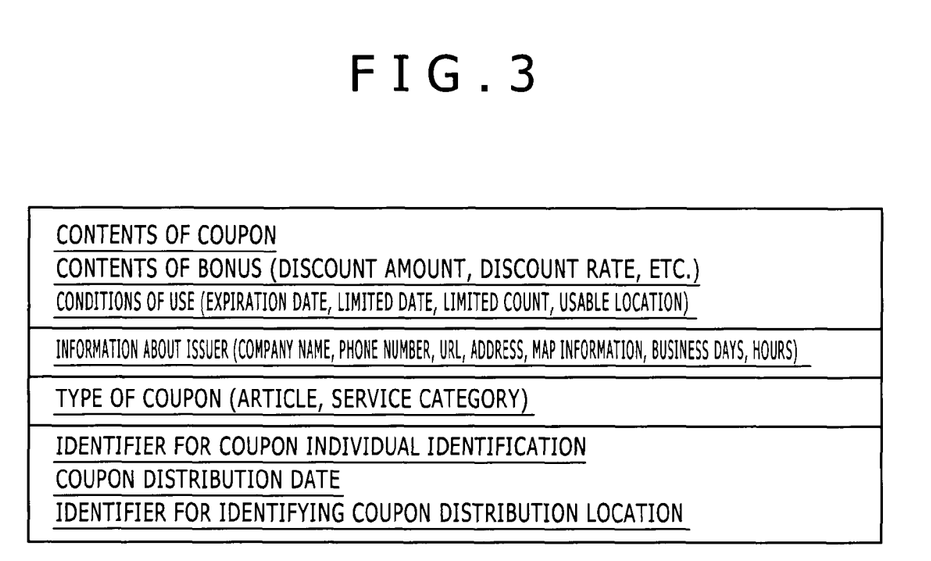
FIG. 3 is a diagram illustrating details of coupon data.

Here, the coupon data CD associated with the card identifier ID of the IC card 3, as shown in FIG. 3, is identifiers and so on that can identify contents of bonus (discount amount, discount rate, etc.) that are contents of coupon, conditions of use (expiration time, limited date of use, limited count, usable location), information about issuer (company name, phone number, URL, address, map information, business day and time), type of coupon (article, service category), coupon identifier for coupon unique identification, coupon delivery date, and coupon delivery location.

Also, as shown in FIG. 2, the communication I/F 21 gets clock data from the clock server 32 that clocks correct time in accordance with a protocol, such as NTP (Network Time Protocol).

Figure 4A:
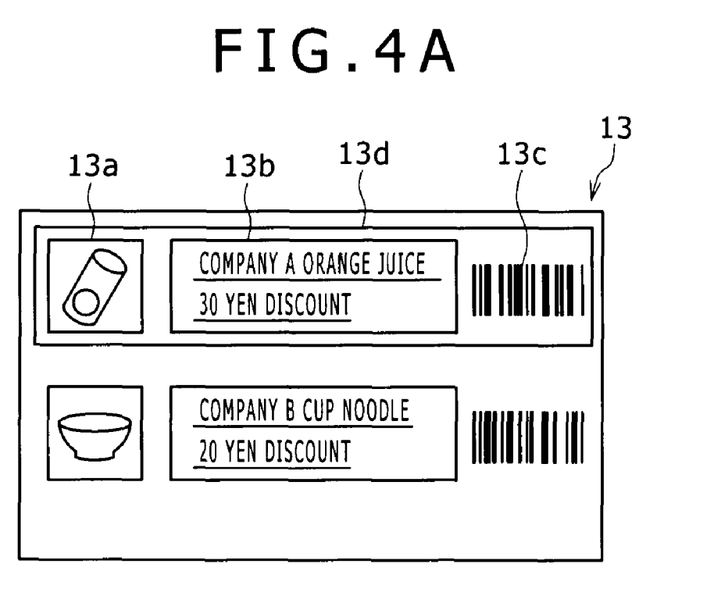
FIG. 4A and FIG. 4B are diagrams illustrating display contents of a display unit.

The barcode generation unit 22 generates a barcode on the basis of the coupon data CD obtained through the communication I/F 21 and outputs the barcode to the display unit 13. Next, on the display unit 13, the barcode and information associated with the barcode made up of characters and symbols readable by the card holder and so on are displayed. For example, the display unit 13, as shown in FIG. 4A, displays a list of coupons in which external photographs 13a of articles, names of articles, discount price 13b, and barcode 13c are put in one set, thereby allowing the selection of one column by use of a cursor 13d. Also, the display unit 13, as shown in FIG. 4B, displays a list of coupons in which external photographs 13a of articles, names of articles and discount price 13b are put in one set, thereby allowing the selection of one column by use of a cursor 13d and displaying the barcode 13c of the article in the selected column.

Figure 4B:
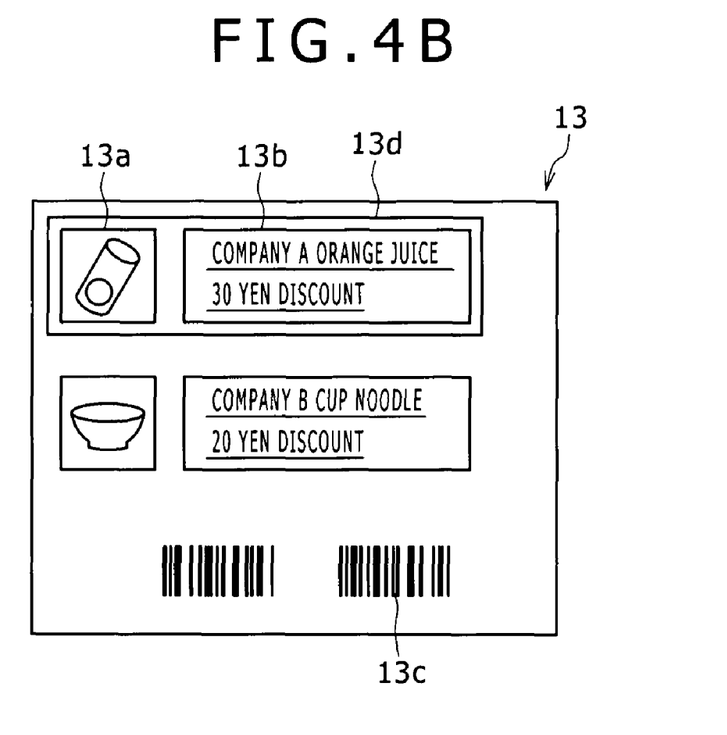

It should be noted that, as with the contents shown in FIG. 3, if contents to be displayed in a barcode are of a wide variety, these contents may be displayed in two or more barcodes as shown in FIG. 4B. In this case, through the barcode reader 2a, the POS terminal 2 can get not only the information about discount from two or more barcodes but also the information shown in FIG. 3 to allow that store to use the obtained customer information for marketing.

As shown in FIG. 1 and FIG. 2, the operation block 14, which is arranged in the proximity of the display unit 13 for example, has a cross key, a pushbuttons and so on and, from among coupons displayed on the display unit 13, by moving the cursor 13d in accordance with a user operation, selects one or more coupons from the coupons displayed on the display unit 13. It should be noted that the operation block 14 may be realized by a touch panel unitized with the display unit 13.

The memory 23 stores the management data of that store, such as the store identifier of that store and the identifiers of articles that are handled by that store and so on. It should be noted that this memory 23 may be a memory incorporated in the device main unit 11 or a management server connected also to the POS terminal 2 for example via a network, such as a LAN and so on, connected via a network in that store.

The barcode reader 24, which is installed on the device main unit 11, has a light source and a detector for detecting the light emitted from the light source and reflected from barcode surface, which the light reflected from barcode surface is detected to read a signal recorded to the barcode. Also, a signal recorded to a barcode is read by capturing an image of a barcode through an imaging element, such as CCD (Charge-Coupled Devices) and so on. The barcode reader 24 herein installed on the device main unit 11 is configured to identify the type of the article 4 by reading the barcode 4a of the article 4. In this regard, the barcode reader 2a of the POS terminal 2 is the same in structure but different in use in which the use is for reading prices and so on of articles at settlement. It should be noted that the POS terminal 2 may be connected to the device main unit 11 to realize the function of the barcode reader 24 by the barcode reader 2a of the POS terminal 2.

The control unit 25 controls the entire operation of the device main unit 11 and has a CPU, a ROM, a RAM, and so on. The control unit 25 controls the displaying of the display unit 13 and so on in accordance with an operation signal from the operation block 14 for example.

Figure 5:
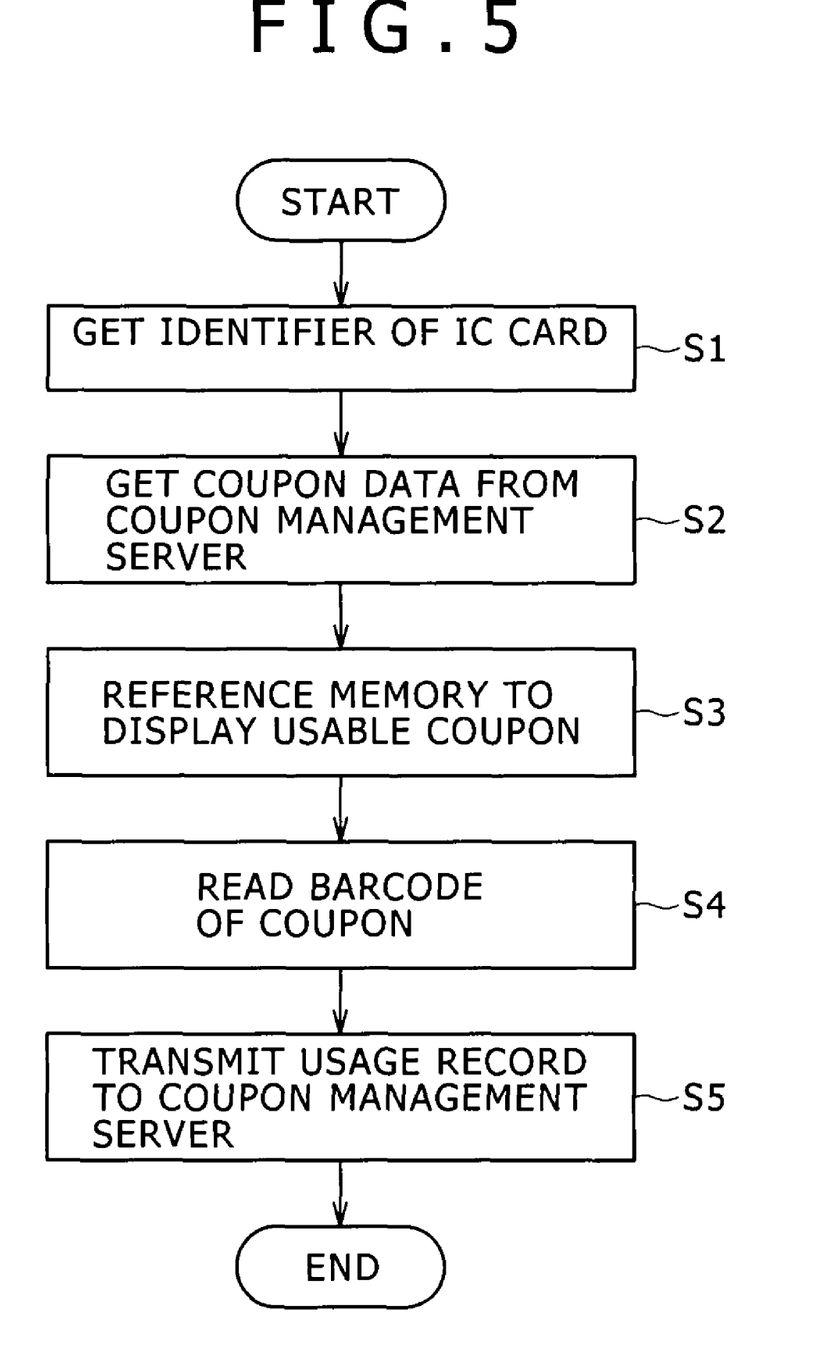
FIG. 5 is a flowchart indicative of an operation of the display device to which the present invention is applied.

Next, a first operation example of the display device 10 will be described with reference to FIG. 5.

In step S1, when, by a card holder who is a customer to purchase an article, the IC card 3 of this customer is held over the device-side non-contact communication unit 12 of the device main unit 11, the control unit 25 reads and gets, via the device-side non-contact communication unit 12, the management data, such as the card identifier ID and so on of the IC card 3 stored in the card memory 3b of the IC card 3.

It should be noted that, some card holders may have two or more IC cards 3 of different types stacked one another in a card case. Thus, if there are two or more IC cards 3 that are in a communicable state, the device-side non-contact communication unit 12 reads and gets the management data, such as the card identifier ID and so on, from all IC cards 3.

In step S2, the control unit 25 accesses the coupon management server 31 via the communication I/F 21, transmits the management data, such as the card identifier ID and so on of the obtained IC card 3, and gets coupon data CD as shown in FIG. 3 associated with the card identifier ID of the IC card 3 read from the IC card 3. Namely, in the coupon management server 31, on the basis of the card identifier ID of the IC card 3 transmitted from the display device 10, the coupon data CD associated with this card identifier ID is extracted and the extracted coupon data CD is transmitted to the display device 10. It is also practicable that, in the coupon management server 31, the coupon data CD be transmitted to the display device 10 by excluding the coupon data CD of expired date or exceeded use count limit.

In step S3, the control unit 25 accesses the memory 23, matches an article type stored in the memory 23 with an article type included in the obtained coupon data CD, and extracts the matching article, thereby displaying the coupon data CD of the matching article in a barcode. Namely, the control unit 25 generates a barcode from the coupon data CD through the barcode generation unit 22 and displays, on the display unit 13, a list of articles including barcodes usable at that store as shown in FIG. 4. Consequently, from the list on the display unit 13, unusable coupons are excluded, which allows the easy selection of coupons to be used from the listed coupons through the operation block 14.

In step S4, the barcode of the article displayed on the display unit 13 and selected by the customer is read by the barcode reader 2a of the POS terminal 2. Next, when a store personnel enters an operation signal for making the coupon to be used, the control unit 25, in step S5, transmits the used data to the coupon management server 31 via the communication I/F 21. In the coupon management server 31, invalidation processing, such as invaliding the used coupon data CD and so on, is executed, thereby preventing this coupon data CD from being used in a duplicate manner.

Next, another operation example of the display device 10 will be described with reference to FIG. 6.

In step S11, when, by a card holder who is a customer to purchase an article, the IC card 3 of this customer is held over the device-side non-contact communication unit 12 of the device main unit 11, the control unit 25 reads and gets, via the device-side non-contact communication unit 12, the management data, such as the card identifier ID and so on of the IC card 3 stored in the card memory 3b of the IC card 3. It is also practicable that, if there are two or more communicable IC cards 3, the management data, such as the card identifier ID and so on, be read from the two or more IC cards 3.

In step S12, the control unit 25, as in step S2, accesses the coupon management server 31 via the communication I/F 21 and gets coupon data CD as shown in FIG. 3 associated with the card identifier ID read from the IC card 3. It is also practicable that, in the coupon management server 31, the coupon data CD be transmitted to the display device 10 by excluding the coupon data CD of expired date or exceeded use count limit.

When the barcode 4a of the article 4 to be settled is read by the barcode reader 24 of the device main unit 11, the control unit 25, in step S13, accesses the memory 23 and gets the identifier, such as the article type and so on of that article 4. The control unit 25 determines whether there is the article type obtained from the barcode 4a of the article 4 among the coupon data CD obtained from the coupon management server 31 and, if the article type is found, then, in step S14, generates a barcode 13c of the coupon from the coupon data CD of that article 4, displaying the barcode on the display unit 13. It should be noted that, if no article type is found, the processing is ended. Consequently, the user can determine, at one glance, whether there is the coupon for an article to be purchased, thereby determining whether to use the coupon or not. It is also practicable that the operation of the step S13 for reading the barcode 4b of the article 4 to be settled be executed before step S12.

In step S15, the barcode 4a of the article 4 displayed on the display unit 13 is read by the barcode reader 2a of the POS terminal 2. Then, when a store personnel enters an operation signal for invalidating the coupon through the operation block 14, the control unit 25, in step S16, transmits the used data to the coupon management server 31 via the communication I/F 21. In the coupon management server 31, invalidation processing, such as invaliding the used coupon data CD and so on, is executed, thereby preventing this coupon data CD from being used in a duplicate manner.

Figure 7:
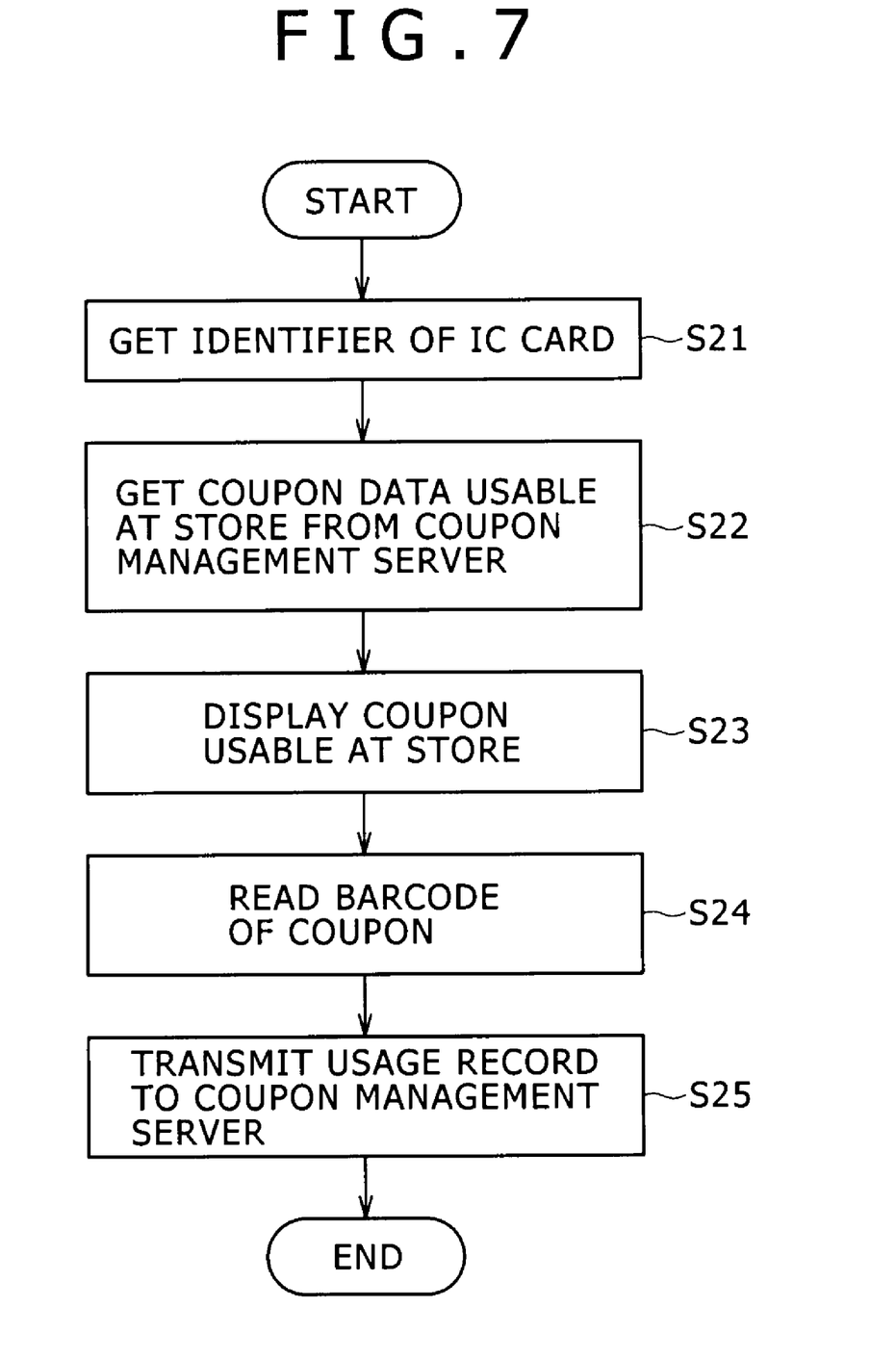
FIG. 7 is a flowchart indicative of another exemplary operation of the above-mentioned display device.

Further, still another operation example of the display device 10 will be described with reference to FIG. 7.

In step S21, when, by a card holder to purchase an article, the IC card 3 of this card holder is held over the device-side non-contact communication unit 12 of the device main unit 11, the control unit 25 reads and gets, via the device-side non-contact communication unit 12, the management data, such as the card identifier ID and so on stored in the card memory 3*b* of the IC card 3. It is also practicable that, if there are two or more communicable IC cards 3, the management data, such as the card identifier ID and so on, be read from the two or more IC cards 3.

In step S22, the control unit 25 reads the identifier of the store from the memory 23, accesses the coupon management server 31 via the communication I/F 21, transmits the identifier of the store to the coupon management server 31 along with the card identifier ID, and gets the coupon data CD as shown in FIG. 3 associated with the card identifier ID read from IC card 3 and the store identifier. Namely, in the coupon management server 31, on the basis of the card identifier ID and the store identifier transmitted from the display device 10, the coupon data CD associated with these identifiers is extracted and the extracted coupon data CD is transmitted to the display device 10. It is also practicable that, in the coupon management server 31, the coupon data CD further be transmitted to the display device 10 by excluding the coupon data CD of expired date or exceeded use count limit.

In step S23, the control unit 25 displays the received coupon data CD in a barcode. Namely, the control unit 25 generates a barcode from the coupon data CD through the barcode generation unit 22 and displays, on the display unit 13, a list of articles including barcodes 13*c* usable at that store as shown in FIG. 4. Consequently, from the list on the display unit 13, unusable coupons are excluded, which allows the easy selection of coupons to be used from the listed coupons through the operation block 14.

It is also practicable that, before displaying barcodes on the display unit 13, the memory 23 be referenced as in abovementioned step S3, and only those barcodes which match further usable conditions at that store be displayed on the display unit 13, thereby enhancing the ease of use of customers.

In step S24, the barcode of the article displayed on the display unit 13 and selected by the customer is read by the barcode reader 2*a* of the POS terminal 2. Then, when a store personnel enters an operation signal for invalidating the coupon through the operation block 14, the control unit 25, in step S25, transmits the used data to the coupon management server 31 via the communication I/F 21. In the coupon management server 31, invalidation processing, such as invaliding the used coupon data CD and so on, is executed, thereby preventing this coupon data CD from being used in a duplicate manner.

The display device 10 as described above is installed in the vicinity of the POS terminal 2 and displays the coupon data CD to be identified by the IC card 3 in barcodes, so that there is no need for changing the design of the existing POS terminal 2. Consequently, coupon services using IC cards can be easily started.

In the above-mentioned examples, the case has been described where the barcode reader 24 of the display device 10 is used for identifying the type of the article 4 by reading the barcode 4*a* of the article 4 and the barcode reader 2*a* of the POS terminal 2 is used for reading the price and so on of each article at the time of settlement, reading the barcode 13*c* displayed on the display unit 13 of the display device 10, and making settlement by applying the coupon; however, as will be described next, it is also practicable, in the present invention, that the barcode reader 24 of the display device 10 be omitted and the function of the barcode reader 24 be added to the barcode reader 2*a* of the POS terminal 2.

Figure 8:
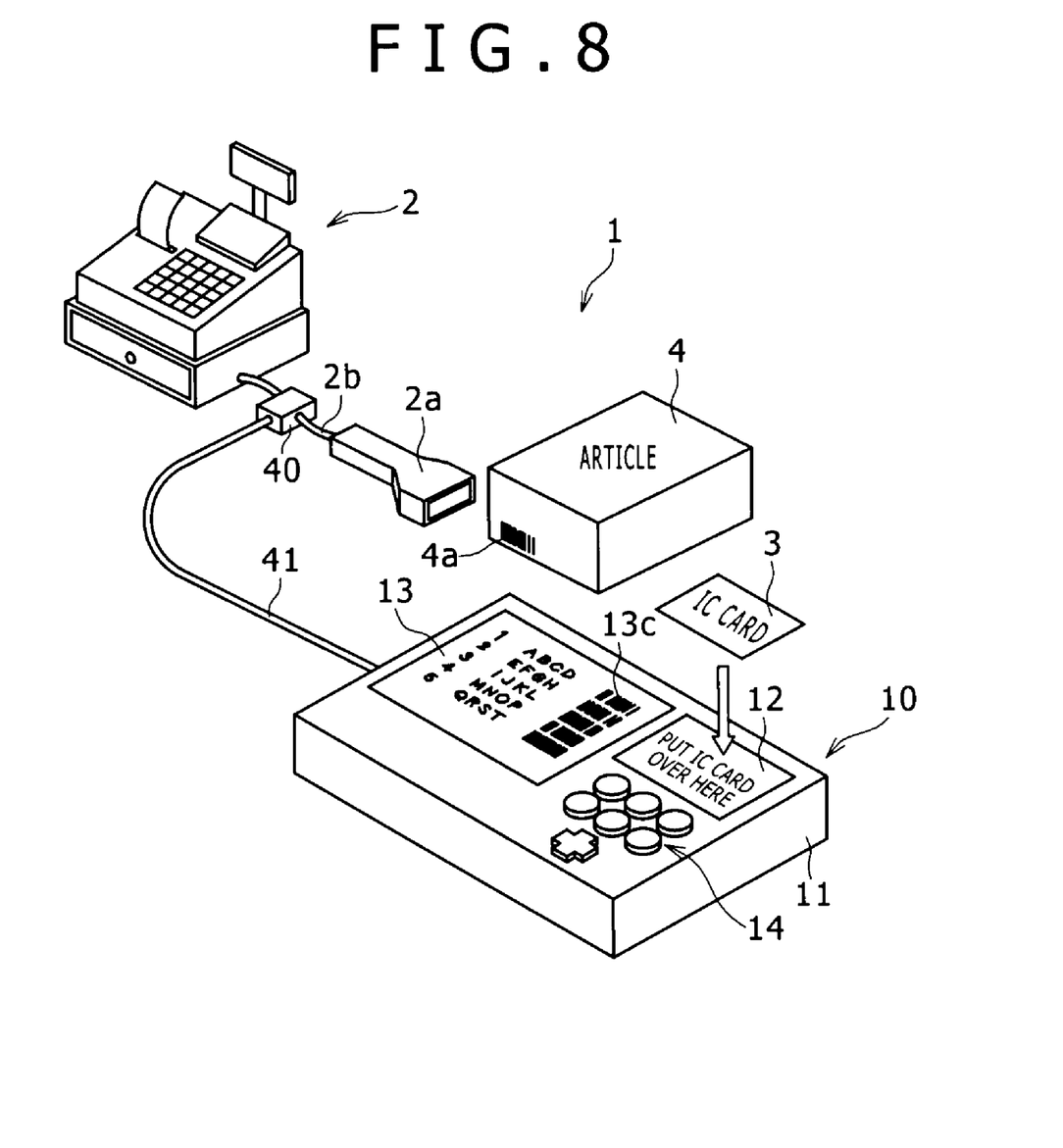
FIG. 8 is a diagram illustrating another exemplary configuration of the present invention using a ripping box.
Figure 9:
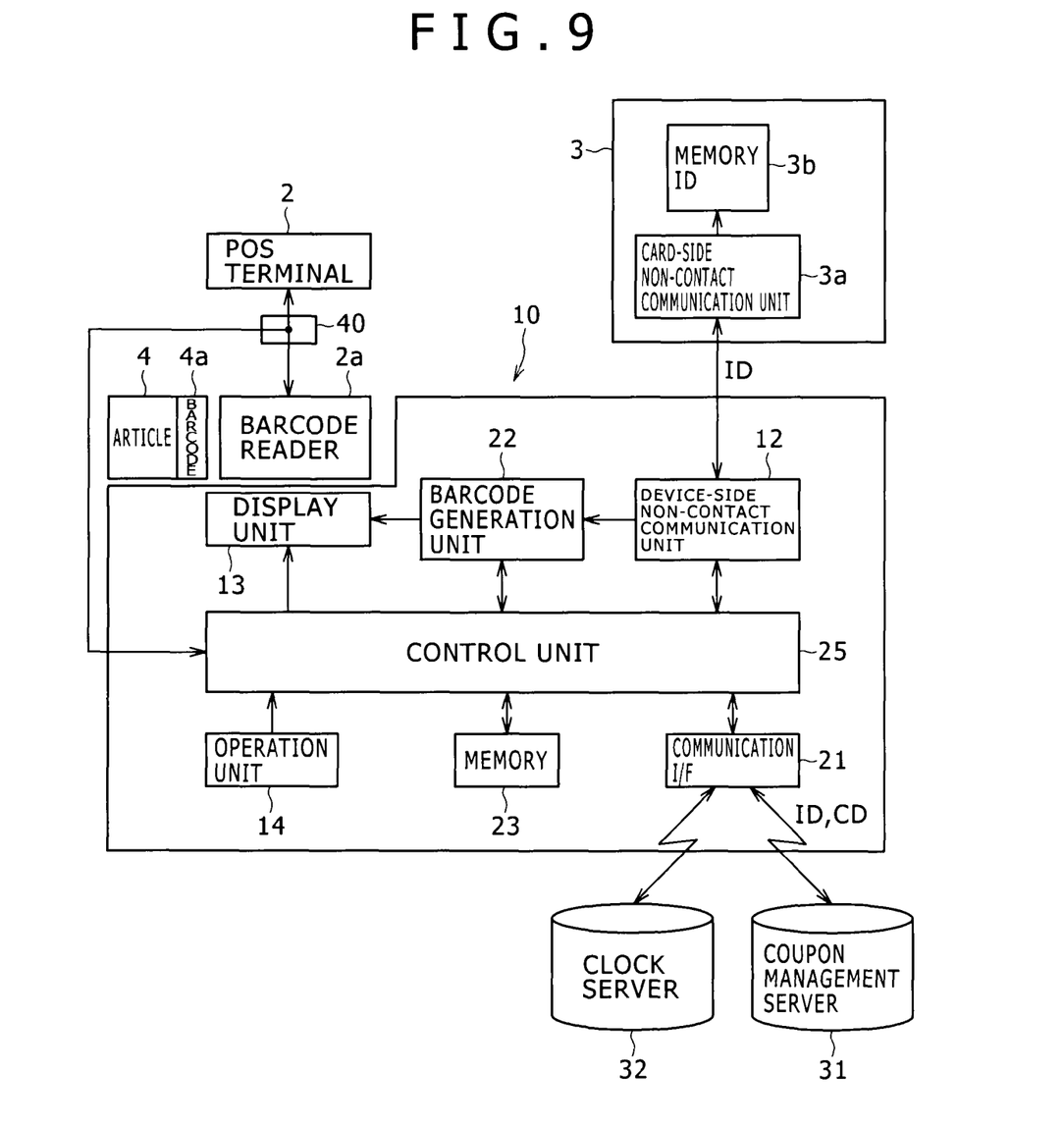
FIG. 9 is a block diagram illustrating another exemplary configuration of the present invention using a ripping box.

In this case, as shown in FIG. 8 and FIG. 9, a connection cord 2*b* for connecting the POS terminal 2 with the barcode reader 2*a* is arranged with a ripping box 40 and the barcode reader 2*a* is connected to the control unit 25 of the display device 10 with a connection cord 41 via this ripping box 40.

Figure 10:
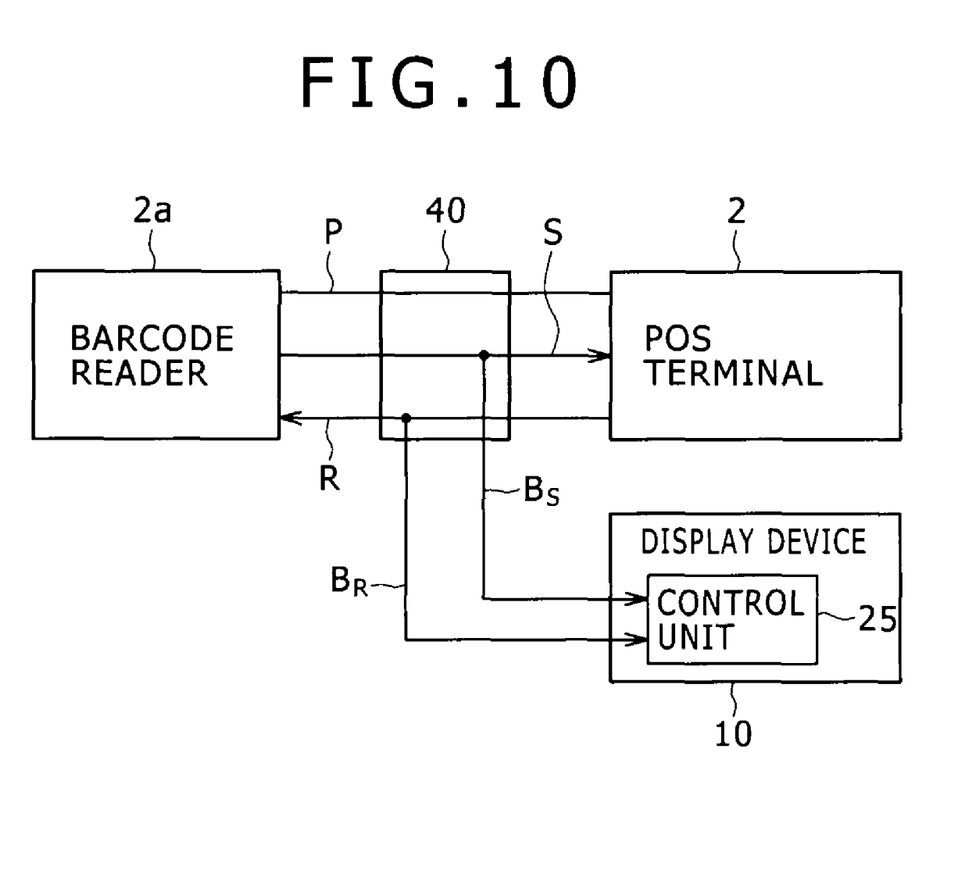
FIG. 10 is a diagram illustrating a configuration of a ripping box.

To be more specific, as shown in FIG. 10, the POS terminal 2 and the barcode reader 2*a* are interconnected by a power supply line P for supplying power from the POS terminal 2 to the barcode reader 2*a*, a send line S for transmitting information of a barcode read by the barcode reader 2*a* to the POS terminal 2, and a return line R for transmitting a barcode read command from the POS terminal 2 to the barcode reader 2*a*. The send line S, to be more specific, transmits, as the information of the barcode 4*a*, article information, such as article code number, price data, and so on, to the POS terminal 2 and the return line R transmits control commands, such as a barcode read start command, a re-request command to be issued when the acquisition by the POS terminal 2 of the article information fails and so on, to the barcode reader 2*a*.

In the ripping box 40, the send line S for transmitting the information of the barcode read by the barcode reader 2*a* to the POS terminal 2 is branched and a branch line $B_S$ is connected to the control unit 25 of the display device 10 and the return line R for transmitting a barcode read start command and so on from the POS terminal 2 to the barcode reader 2*a* is branched and a branch line $B_R$ is connected to the control unit 25 of the display device 10. Consequently, the ripping box 40 can enter the information of the barcode read by the barcode reader 2*a* into the control unit 25 in addition to the POS terminal 2.

Figure 6:
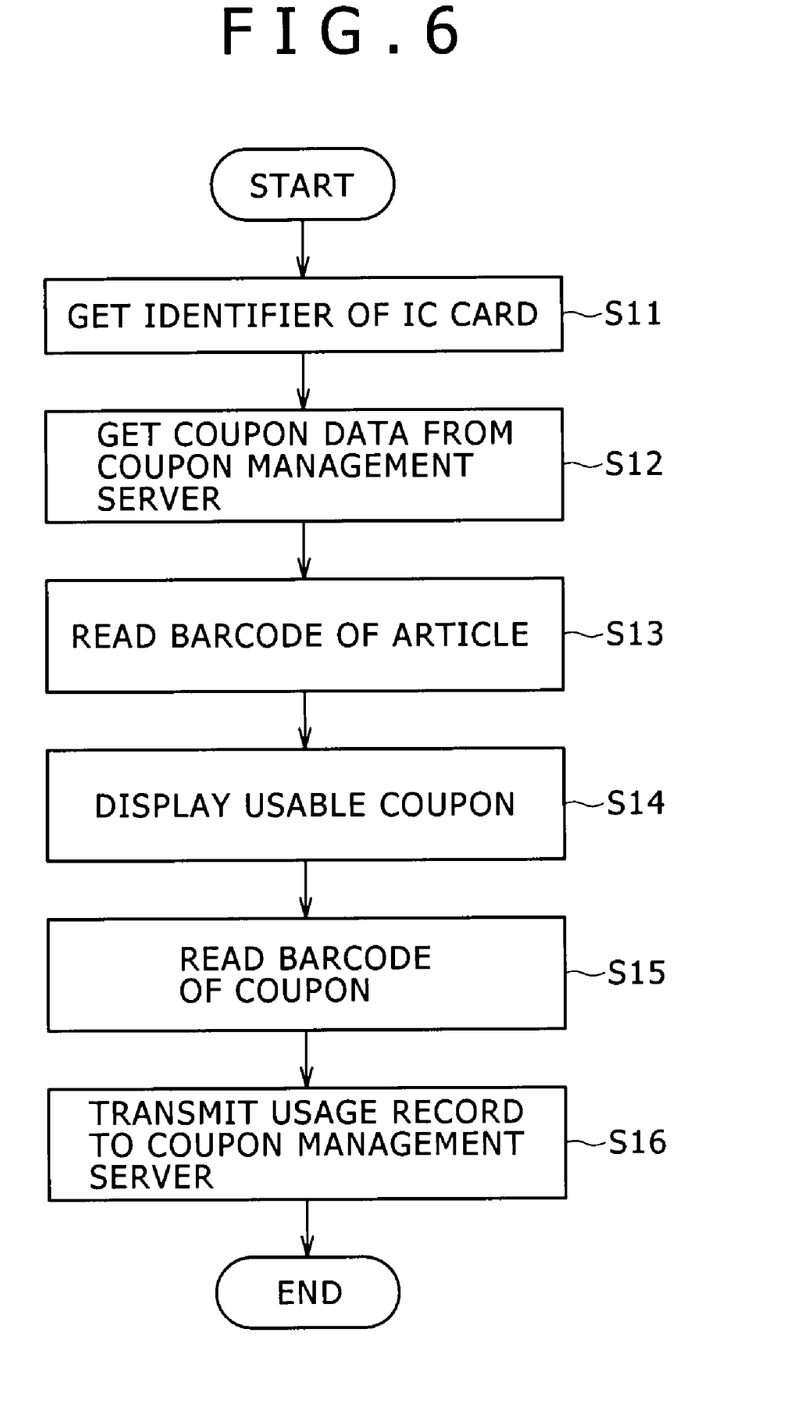
FIG. 6 is a flowchart indicative of another exemplary operation of the above-mentioned display device.

Such a system can be applied to the processing shown in above-mentioned FIG. 6. Namely, in the example shown in FIG. 6, in step S13, the barcode 4*a* of the article 4 to be settled is read by the barcode reader 24 of the device main unit 11. In this example, in place of this barcode reader 24, the barcode reader 2*a* connected to the control unit 25 of the display device 10 reads the barcode 4*a* of the article 4 to be settled. Consequently, in step S14, the control unit 25 can generate the barcode 13*c* of the coupon from the coupon data CD of the article 4 and display the barcode 13*c* on the display unit 13 and, further, execute processes of step S15 and step S16.

Thus, in the examples shown in FIG. 8 through FIG. 10, the arrangement of the ripping box 40 eliminates the necessity of changing the design of the POS terminal 2 itself, thereby easily allowing the introduction of a system that uses the display device 10.

Meanwhile, in order to prevent barcodes of coupon data CD displayed on the display unit 13 from being illegally copied and abused, an expiration time may be provided or a cryptographic technology may be used when displaying barcodes of coupon data CD on the display unit 13.

Here, for the barcode 13*c* of the coupon data CD displayed on the display unit 13, expiration time information of barcode as visual information different in concept from the expiration time of coupon is provided. For example, the control unit 25 sets the expiration time information of the barcode 13*c* displayed on the display unit 13 to 10 minutes, 20 minutes from displaying. Here, the start point of expiration time is display start time, end time, or the like on the display unit 13 to be identified by clock information obtained from the clock server 32 via the communication I/F 21. Then, the control unit 25 invalidates the barcode 13c of which expiration time has expired. Consequently, the barcode 13c displayed on the display unit 13 can be prevented from being valid infinitely from being displayed on the display unit 13, thereby preventing the barcode 13c from being copied and abused at the time of display, for example.

For example, in the barcode generation unit 22, the expiration time information of the barcode 13c of the coupon data CD to be displayed on the display unit 13 is encrypted by a secret common key shared between the POS terminal 2 and the display device 10 and the encrypted data is added when the barcode 13c is generated from the coupon data CD. In this case, the display device 10 stores the secret common key in the memory 23, encrypts the expiration time information by the secret common key in the memory 23 when generating the barcode 13c of the coupon data CD, generates the barcode 13c added with this encrypted data, and displays the barcode 13c on the display unit 13. Then, in the POS terminal 2, the barcode 13c is read and then the expiration time information is decrypted by a secret common key stored in a memory of its own, the read barcode 13c is authenticated to be authorized, and the settlement processing of the article 4 is executed. Consequently, the barcode 13c of the coupon data CD displayed on the display unit 13 can be used only by the authorized POS terminal 2. It is also practicable that, in addition to expiration time information or in place of expiration time information, the coupon data CD itself indicated by the barcode 13c be encrypted by the secret common key.

Further, a following variation is possible. In this variation, a secret key is stored in the POS terminal 2 and a public key corresponding to the secret key of the POS terminal 2 is stored in the memory 23 of the display device 10. Then, in the display device 10, the above-mentioned expiration time information is encrypted by the public key by the barcode generation unit 22 and the barcode is displayed on the display unit 13. Then, in the POS terminal 2, the barcode 13c is read and then the expiration time information is decrypted by the secret key stored in itself, the read barcode 13c is authenticated for authorization, and the settlement processing of the article 4 is executed. In this case, in another POS terminal 2, no secret key is owned, so that the coupon cannot be used. Also, in the POS terminal 2, by encrypting the expiration time information and determining that the time has been expired, the same coupon can be prevented from being repeatedly used on the POS terminal 2 having the secret key.

In addition, in the above-mentioned example, an example in which the public key is stored in the memory 23 of the display device 10 was described; it is also practicable that this public key be owned by the coupon management server 31. In this case, the coupon management server 31 transmits the encrypted coupon data CD to the display device 10. Consequently, near the POS terminal 2, no public key that can decrypt the coupon data CD exists, thereby allowing the transfer of coupon data CD in a securer manner.

It should be noted that the symbol to be used may be a two-dimensional symbol, such as a QR code, in addition to a one-dimensional symbol, such as a barcode. Also, in the present invention, the contents of a symbol represented one-dimensionally or two-dimensionally may be a novelty and so on in addition to discount coupons as far as the contents are bonus for customers. Besides, the IC card 3 may be one that is incorporated in a mobile phone to realize the function of the IC card 3. In the above-mentioned examples, in getting coupon data CD, the card identifier ID unique to the IC card 3 was described; however, it is also practicable to use the identifier of the company issuing the IC card 3 instead of the card identifier ID and both of the card identifier ID unique to the IC card 3 and the identifier of the company issuing the IC card 3.

The invention claimed is:

1. A display device comprising:
    non-contact communication means configured to read a card identifier stored in a memory of an IC card;
    generation means configured to generate a one-dimensional or two-dimensional symbol of bonus data associated with the card identifier read by said non-contact communication means; and
    display means configured to display the symbol of the bonus data generated by said generation means;
    wherein the bonus data displayed in the symbol displayed on said display means is read by a reading means of a POS terminal.

2. The display device according to claim 1,
    wherein said generation means, on the basis of the card identifier obtained by said non-contact communication means, gets usable bonus data from a management means of said bonus data and displays the bonus data on said display means in the form of a symbol.

3. The display device according to claim 2, further comprising
    a memory configured to manage an article to be handled by a store with said POS terminal installed,
    wherein said display means displays the bonus data of an article managed in said memory among the bonus data obtained by said management means.

4. The display device according to claim 2, further comprising
    symbol reading means,
    wherein said display means displays a symbol of the bonus data that matches article information attached to an article read by said reading means among the bonus data obtained by said management means.

5. The display device according to claim 1, characterized in that
    said generation means encrypts at least a part of the bonus data to be displayed on said display means.

6. The display device according to claim 5,
    wherein said generation means encrypts expiration time information of said symbol and attaches the encrypted expiration time information to said symbol, and
    said expiration time information is decrypted on said POS terminal so as to authenticate the read symbol for authorization.

7. The display device according to claim 1,
    wherein said generation means attaches expiration time information of said symbol to the said symbol and,
    on said POS terminal, references said expiration time information so as to authenticate the read symbol for authorization.

8. A data processing method comprising:
    a step of reading, through non-contact communication means, a card identifier stored in a memory of an IC card;
    a step of generating, through generation means, one-dimensional or two-dimensional symbol of bonus data associated with the card identifier read by said non-contact communication means;
    a step of displaying bonus data generated through said generation means onto display means in the form of a symbol; and
    a step of reading, through reading means of a POS terminal, the bonus data displayed on said display means in the form of a symbol.

9. A data processing system comprising
a POS terminal and a display device arranged in the vicinity of the POS terminal,
said POS terminal being connected with reading means configured to read one-dimensional or two-dimensional symbol of an article,
said display device having non-contact communication means configured to read a card identifier stored in a memory of an IC card and generation means configured to generate one-dimensional or two-dimensional symbol of bonus data associated with the card identifier read by this non-contact communication means, and display means configured to display the symbol of the bonus data generated by this generation means,
the reading means of said POS terminal further being connected to said display device via ripping means,
wherein, when the symbol of said article has been read by said reading means, said display means displays a symbol of bonus data matching article information attached to an article read by said reading means among the bonus data associated with the card identifier read by said non-contact communication means.

10. A data processing method comprising:
a step of reading a card identifier stored in a memory of an IC card by non-contact communication means;
a step of reading one-dimensional or two-dimensional symbol of an article by reading means of said POS terminal connected to a display device via ripping means;
a step of generating, by generating means, a symbol of bonus data matching article information attached to an article read by said reading means among bonus data associated with the card identifier read by said non-contact communication means;
a step of displaying the bonus data generated by said generating means onto display means; and
a step of reading, by said reading means, the bonus data displayed on said display means in the form of a symbol.

* * * * *